2,982,930
CORROSION PROBE WITH ENCASED REFERENCE SPECIMEN

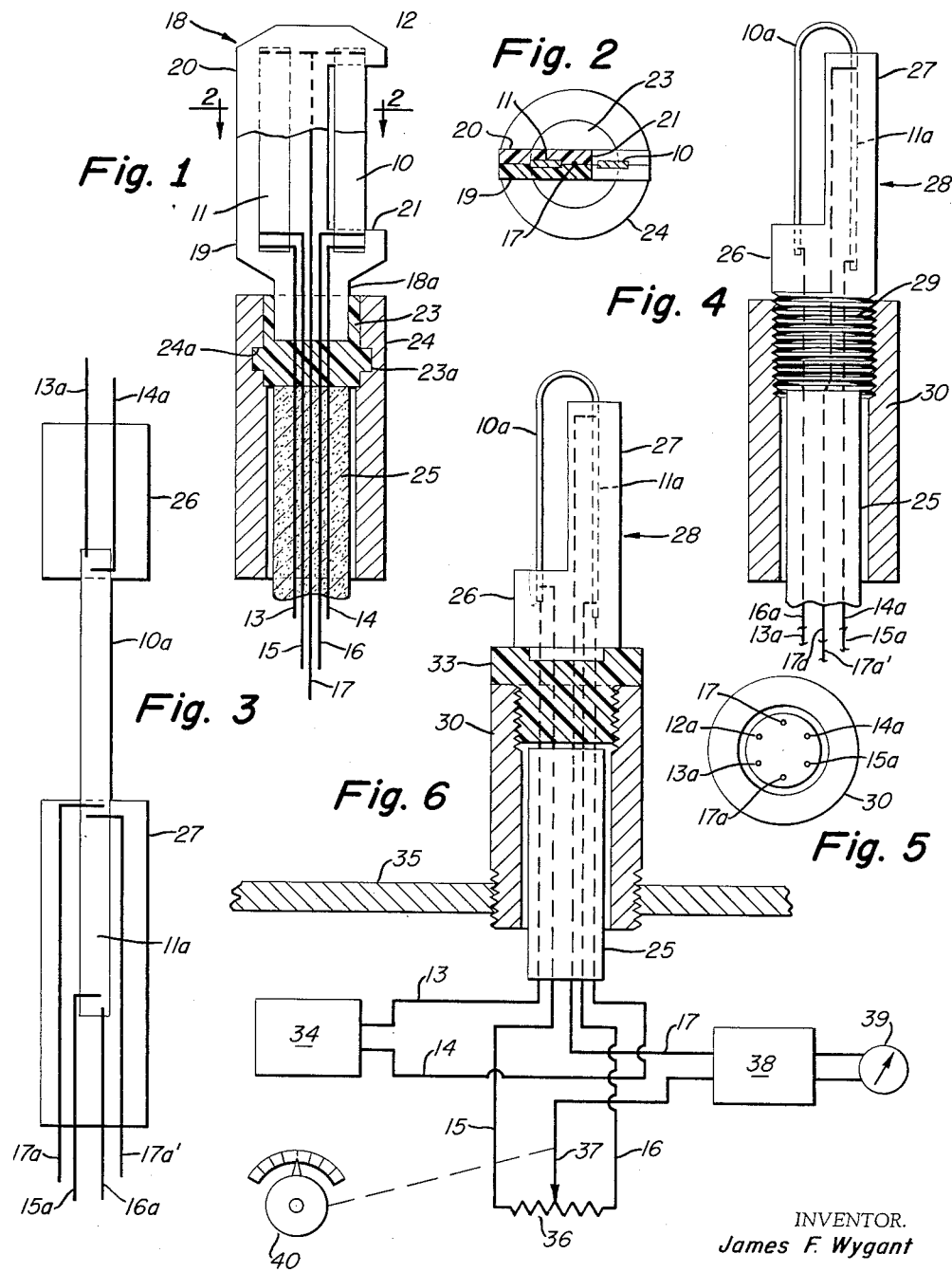
May 2, 1961 — J. F. WYGANT — 2,982,930
CORROSION PROBE WITH ENCASED REFERENCE SPECIMEN
Filed Jan. 23, 1958
INVENTOR.
James F. Wygant
BY
ATTORNEY United States Patent Office 2,982,930
Patented May 2, 1961

James F. Wygant, Gary, Ind., assignor to Standard Oil Company, Chicago, Ill., a corporation of Indiana Filed Jan. 23, 1958, Ser. No. 710,650

2 Claims. (Cl. 338—13)

This invention relates to apparatus for measuring rates of corrosion and erosion. More particularly it relates to an improved test probe construction for electrical measurement of such rates in the presence of industrial substances.

Heretofore an electrical resistance system has been developed which directly measures loss of metal from a test probe exposed to a corrosive substance within process equipment, pipelines, and the like. By electrically measuring the reduction in mass of an expendable test sample exposed to a corrodent the rate of corrosion of the equipment itself can be determined quickly and accurately. Likewise the system may be used for evaluating the effectiveness of chemical corrosion inhibitors.

The corrosion rate determinations may be made automatically either in a periodic or continuous manner in terms of resistance of the specimen. The relative resistance of the specimen before and after exposure can be determined, for example, by measuring the rate of change of a potential necessary to maintain a constant current across the sample.

Resistance of the exposed specimen is not measured directly by a metering circuit, but a second specimen is placed in the probe and connected in series to the first specimen. Both specimens are made part of a bridge circuit with the second or reference specimen being covered with a corrosion resisting coating, the reference specimen thereby retaining its original cross-section and resistance.

Changes in the ratio of the two resistances, due to changes in the resistance of the exposed element, are translated directly into units of corrosion by the meter circuit. Systems of this type are covered by Dravnieks U.S. Patent 2,735,754.

Where test probes are to be inserted in process equipment, it evident that the probe must be such durability that it may withstand all mechanical and thermal shocks to which the equipment itself may be exposed. Moreover, the test probes should be low in cost. It is also highly desirable that the probes be adapted such that temperature variations of the surrounding medium, which alter the expendable test sample resistance, may readily be compensated for automatically.

A typical corroding test specimen for use in conductometric corrosion testing is relatively thin, for example, from a few thousandths of an inch to about thirty thousandths of an inch thickness. The cross-section of the reference specimen used with such corroding specimen is desired to be approximately identical to that of the corroding specimen. Further, the two specimens, to be strictly comparable, should undergo identical physical and thermal treatment during the fabrication of the test probe assembly embodying the two specimens. To secure the desired similarity, it is preferred that the corroding specimen and the reference specimen comprise adjacent portions of a strip cut from a single piece of metal. A typical strip may be 3/16 to 1/4 inch wide and 1/2 to 2 inches long for each portion.

The narrow width and the sharp edge curvature of such specimens makes it difficult to obtain good coverage with conventional organic protective coating produced from solutions. In addition, fluoro-carbons, such as polytetrafluoroethylene and polytrifluorochloroethylene, which are potentially the most useful organic protective media because of their broad chemical resistance and unusual stability at elevated temperatures, are relatively difficult to apply as non-porous coatings required for corrosion protection. In efforts to apply such coatings, a physical or chemical surface treatment of sufficient violence to disturb the metal of the specimen may be required prior to coating in conventional ways and such surface treatment alters the specimen.

It is, therefore, an important object of the present invention to provide a test probe assembly adapted for use in corrosion testing systems. It is a further object of the invention to provide a test probe having a structure which compensates for the effects of temperature on the electrical properties of the expendable and reference specimens. An additional object is to provide a unitary test probe comprising a reference specimen covered with a corrosion resistant material. It is also an object of the invention to provide a test element which is reproducibly and inexpensively constructed. Still another object of the invention is to provide a test probe which avoids the difficulties heretofore encountered in coating probe assemblies. These and other objects of the invention will become apparent as the description of the invention proceeds.

Briefly, according to my invention, the reference specimen and the electrical leads to both the reference specimen and the test specimen are protected from corrosion by encasing within a built-up monolithic plastic or resin mass which is resistant to the corroding medium in which the study or evaluation is made.

More particularly the electrical elements of the test probe are encased between thermoplastic or heat sealable sheets or blocks. The sheets are placed under heat and pressure to cause the sheets to conform to the specimen probe assembly and to effect a seal between the sheets while providing a rigid probe skeleton. This can be done by using polyethylene, polystyrene, polymethyl methacrylate, polyvinyl chloride, or other known thermoplastic resins and plastics. The preferred materials, however, are polytrifluorochloroethylene (marketed commercially as "Kel-F," etc.) and polytetrafluoroethylene (marketed commercially as "Teflon").

Thus I attain the objects of the invention by providing a corrosion test probe in which all parts thereof, except the expendable test specimen, are embedded in a monolithic corrosion resistant organic plastic case. In addition, all lead junctions, as well as the reference specimen, are enclosed in plastic and completely shielded from the corrosion substance.

Further details and advantages of the invention will be described by reference to the accompanying drawings wherein:

Figure 1 is an elevation partly in section illustrating an embodiment of the invention;

Figure 2 is a section taken along the line 2—2 in Figure 1;

Figure 3 is a plan view of a probe assembly illustrating an intermediate step in its fabrication;

Figure 4 is an elevation of a device embodying the complete structure of Figure 3 mounted in a probe assembly;

Figure 5 is an end view of the apparatus in Figure 4; and

Figure 6 is an elevation of another embodiment of the probe assembly shown in conjunction with a schematic circuit diagram.

Referring to Figures 1 and 2, the test probe assembly comprises an expendable test specimen 10, a reference specimen 11, connector 12 between adjacent ends of the reference and test specimens 11 and 10, a pair of current leads 13 and 14, a group of potential leads 15, 16 and 17, and a plastic casing 18 made up of laminated sheets 19 and 20. The sheets 19 and 20 are generally C-shaped, i.e. the casing 18 is provided with a recess 21 cut or pressed into the sheets 19 and 20 prior to bonding in order to leave the test specimen 10 exposed.

The metallic elements comprising the specimens 10 and 11, the connector 12, and the leads 13 to 17 are welded, soldered, or brazed to form an essentially fixed planar assembly. This assembly is placed between the two plastic sheets 19 and 20 which are preferably thermoplastic materials that may be bonded by heat and pressure about the electrically conducting portions of the probe assembly. The sheets 19 and 20 may be of any substantial thickness, a preferred thickness being from about $\frac{1}{32}$ inch to about $\frac{1}{16}$ inch.

When the sheets 19 and 20 are laminated, all the lead junctions are embedded in the monolithic plastic casing 18 which provides resistance to mechanical shock, protects the reference specimen 11 from the corrosive material, insulates the lead junctions from each other, and provides a probe skeleton which may be removably supported by a suitable fitting 24 by embedding the shank 18a within a plug 23 of corrosion resistant cement within a probe body 24. If desired, the plug 23 may be cast with an external collar 23a projecting into an internal recess 24a in the probe body 24 to prevent withdrawal of the plug 23. The leads 13 to 17 are encased within a mass 25 of cement.

In heat bonding the sheets 19 and 20, the assembly of specimens and leads disposed between the plastic sheets, is placed between rigid metal platens (not shown) and these platens (stainless steel, aluminum, or brass is suitable) are clamped together to place the assembly under moderate pressure. The entire assembly is then heated by electrical or induction heating of the platens to the sintering temperature of the sheets 19 and 20 (about 720 to 740° F. when polytetrafluoroethylene is used and about 450 to 550° F. when polytrifluorochloroethylene is the plastic material).

Encasement in other thermoplastic materials can be accomplished in a similar manner but at temperatures appropriate to the particular material chosen. (However, bonding of the sheets 19 and 20 may be accomplished in some cases with a solvent for the plastic.) The sintering temperature is maintained for about 15 minutes if the total resin thickness is about $\frac{1}{16}$ inch and for a longer period in direct proportion to the combined thickness of the sheets 19 and 20. The assembly is then cooled and the casing 18 may be trimmed to the desired size.

To facilitate the bonding of the sheets 19 and 20 when polytetrafluoroethylene is used, an unsintered polytetrafluoroethylene film may be placed against one or both facing surfaces of the sheets 19 and 20. The pressure on the platents is increased as required to cause the plastic sheets 19 and 20 to conform closely to the welded metal specimen assembly until the monolithic casing 18 is formed.

Test specimen 10 has a length and width as large as is consistent with convenient protection of the reference specimen 11 in the test probe within a vessel. It has a cross-section and surface area which are selected to provide the optimum precision and accuracy in measuring corrosion rates. For example, if corrosion is relatively slow, the specimens 10 and 11 may be quite thin so that a small reduction in metal thickness is actually a large percentage reduction. On the other hand, if corrosion rates are rapid or if it is desired to maintain a corrosion probe installation without replacement for a long period of time, then the thickness of the specimens 10 and 11 may be increased.

When it is desired that the corrosion probe remain in service for long periods of time, wires of suitable diameter, such as $\frac{1}{16}$ inch, may be used instead of the strip specimens 10 and 11.

Referring to Figures 3–6, the test specimen 10a is a continuation of the reference specimen 11a. The test specimen 10a is formed in a loop as shown in Figures 4 and 6 by bonding the laminated casing segments 26 and 27 to form a single monolithic rod or bar 28.

In Figure 3, the reference specimen 11a, together with leads 15a, 16a, 17a, and 17a' is pre-assembled by welding or the like and placed between two sheets 26 of plastic material and bonded as described above. The remaining end of the test specimen 10a, together with the leads 13a and 14a is pre-assembled by welding or the like and placed between two sheets 27 of thermoplastic material and also bonded as described above. The test specimen 10a is then bent back upon itself and the casing segments 26 and 27 are aligned to form the configuration shown in Figures 4 and 6. This configuration is made permanent by fusing the two casing segments 26 and 27 to form the monolithic bar 28. This second heating and bonding does not require that the plastic conform closely to any electrical network and need not be conducted under such high temperature or pressure as was necessary in forming the casing segments 26 and 27.

A finished article may be formed in a single operation. This is done, for example, when it is desired to provide two separate center potential leads 17a and 17a' to the two specimens 10a and 11a, and to position the six leads in exact hexagonal configuration to fit into female connector plugs or rigid insulators, as shown in Figures 4 and 5.

A typical metal specimen with six attached leads for such an operation is shown in Figure 4; the metal assembly with specimens and leads is arranged between plastic sheets or slabs prior to heating. An advantageous modification of the thermal forming of the bar 28 is to employ dies to shape the exterior surface thereof to any desired configuration as, for example, to produce a shoulder or threads 29 (Figure 4) and the like. This results in a saving in machining or other processing which may be otherwise required to provide a probe bar of the desired configuration for mounting in the fitting 30 or for other reasons.

It may not be possible, particularly with heavy gauge lead wires, to obtain complete sealing of thermoplastic sheets about a lead wire at the point of emergence from the probe block bar 18 or 28. However, if desired, recesses or channels (not shown) may be cut or pressed in the bonding faces of the laminated sheets in order to accommodate heavy lead connections. Also a complete seal can be obtained by vacuum impregnation of the probe assembly using an appropriate thermosetting or catalyzed air-setting resin, such as an epoxy-phenolic composition.

In Figure 6, the reference and test specimens comprise arms of a bridge circuit which is operated by the potentiometric null method. This permits the use of long leads from the probe to the meter. The specimen assembly with its plastic casing and the exposed test specimen is supported in threaded fitting which accommodates the threaded base to which the shank of the casing is cemented, the leads passing through the ceramic insulator within the probe body.

A current source 34 is applied by current leads 13 and 14 to the probe assembly. The test specimen 10 is exposed to the corrosive system through the wall 35, the entire probe being removably supported by threaded plug 33 secured within probe fitting 30. The potential leads 15 and 16 are connected to the potentiometer 36, the slide wire 37 of which is connected to lead 17 through the amplifier 38, the output of which is fed to null detector 39. The slide wire 37, linked to the corrosion indicating dial 40, is adjusted to attain the null reading at 39.

In the most corrosive situations, a layer of carbon-filled furane resin reinforced with glass cloth may be applied to cover the mounting fitting 30 and the thermosetting (e.g. epoxy) potting and mounting resin plug 31. Other mounting methods suitable for use in more common corrosive environments are shown in Figures 1, 4 and 6.

Although the invention has been described with reference to preferred embodiments thereof, it is to be understood that these are by way of illustration only. Accordingly, it is contemplated that modifications and variations can be made in the apparatus by those skilled in the art in light of my description without departing from the spirit of the invention.

What I claim is:

1. A corrosion test probe assembly comprising an electrically non-conducting probe bar having offset segments, an expendable metal test specimen mounted in said probe and extending between said segments, the terminal portions of said test specimen being embedded within said probe, an electrically conducting reference specimen embedded within said probe and arranged adjacent to said test specimen, said reference specimen and said test specimen being in electrical series, a pair of current leads, one of said leads being electrically connected to said test specimen and the other of said leads being electrically connected to said reference specimen, said current leads and their junctions with said test and reference specimens being embedded within said probe, a first pair of potential leads, one of said potential leads being connected to said test specimen and the other of said potential leads being connected to said reference specimen, said potential leads and their junctions with said test and reference specimens being embedded within said probe, and electrical conductor means connected to said reference specimen at a point remote from said current and potential leads, said electrical conductor means and the junction with said reference specimen being embedded within said probe.

2. A corrosion test probe assembly comprising an electrically non-conducting probe bar having segments providing a generally C-shaped configuration, an expendable metal test specimen mounted in said probe and extending between said segments, the terminal portions of said test specimen being embedded within said probe, an electrically conducting reference specimen embedded within said probe and arranged adjacent to said test specimen, said reference specimen and said test specimen being in electrical series, a pair of current leads, one of said leads being electrically connected to said test specimen and the other of said leads being electrically connected to said reference specimen, said current leads and their junctions with said test and reference specimens being embedded within said probe, a first pair of potential leads, one of said potential leads being connected to said test specimen and the other of said potential leads being connected to said reference specimen, said potential leads and their junctions with said test and reference specimens being embedded within said probe, and electrical conductor means connected to said reference specimen at a point remote from said current and potential leads, said electrical conductor means and the junction with said reference specimen being embedded within said probe.

References Cited in the file of this patent

UNITED STATES PATENTS

| 2,735,754 | Dravnieks | Feb. 21, 1956 |
| 2,834,858 | Schaschl | May 13, 1958 |
| 2,851,570 | Schaschl | Sept. 9, 1958 |
| 2,856,495 | Chittum et al. | Oct. 14, 1958 |
| 2,869,003 | Marsh et al. | Jan. 13, 1959 |